(12) United States Patent
Cherepanov et al.

(10) Patent No.: US 10,679,609 B2
(45) Date of Patent: *Jun. 9, 2020

(54) BIASING VOICE CORRECTION SUGGESTIONS

(71) Applicant: Google LLC, Mountain View, CA (US)

(72) Inventors: Evgeny A. Cherepanov, Adliswil (CH); Jakob Nicolaus Foerster, San Francisco, CA (US); Vikram Sridar, Zurich (CH); Ishai Rabinovitz, Haifa (IL); Omer Tabach, Givataim (IL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,685

(22) Filed: Dec. 3, 2019

(65) Prior Publication Data

US 2020/0105247 A1 Apr. 2, 2020

Related U.S. Application Data

(63) Continuation of application No. 16/268,957, filed on Feb. 6, 2019, now Pat. No. 10,529,316, which is a continuation of application No. 15/789,575, filed on Oct. 20, 2017, now Pat. No. 10,242,662, which is a continuation of application No. 14/988,074, filed on Jan. 5, 2016, now Pat. No. 10,049,655.

(51) Int. Cl.
*G10L 15/22* (2006.01)
*G10L 15/26* (2006.01)
*G10L 15/30* (2013.01)
*G10L 15/01* (2013.01)
*G10L 15/187* (2013.01)

(52) U.S. Cl.
CPC ............ *G10L 15/01* (2013.01); *G10L 15/187* (2013.01); *G10L 15/265* (2013.01)

(58) Field of Classification Search
CPC .......... G10L 15/22; G10L 15/26; G06F 3/167
See application file for complete search history.

(56) References Cited

U.S. PATENT DOCUMENTS

| | | | | |
|---|---|---|---|---|
| 6,122,613 | A * | 9/2000 | Baker | ..... G10L 15/32 704/235 |
| 6,513,005 | B1 * | 1/2003 | Qin | ..... G06K 9/6293 704/231 |
| 6,735,565 | B2 | 5/2004 | Gschwendtner | |
| 6,912,498 | B2 | 6/2005 | Stevens et al. | |
| 7,200,555 | B1 * | 4/2007 | Ballard | ..... G10L 15/22 704/235 |
| 7,356,467 | B2 | 4/2008 | Kemp | |

(Continued)

*Primary Examiner* — Shreyans A Patel
(74) *Attorney, Agent, or Firm* — Honigman LLP; Brett A. Krueger

(57) ABSTRACT

Methods, systems, and apparatus, including computer programs encoded on computer storage media, for natural language processing. One of the method includes receiving a voice input from a user device; generating a recognition output; receiving a user selection of one or more terms in the recognition output; receiving a user input of one or more letters replacing the user selected one or more terms; determining suggested correction candidates based in part on the user input and the voice input; and providing one or more suggested correction candidates to the user device as suggested corrected recognition outputs.

20 Claims, 4 Drawing Sheets

(56) References Cited

U.S. PATENT DOCUMENTS

| | | | |
|---|---|---|---|
| 8,290,772 B1* | 10/2012 | Cohen | G06F 17/276 |
| | | | 369/25.01 |
| 8,719,014 B2 | 5/2014 | Wagner | |
| 2002/0138265 A1* | 9/2002 | Stevens | G10L 15/22 |
| | | | 704/251 |
| 2006/0015338 A1 | 1/2006 | Poussin | |
| 2006/0293889 A1* | 12/2006 | Kiss | G10L 15/22 |
| | | | 704/235 |
| 2006/0293890 A1* | 12/2006 | Blair | G06F 3/018 |
| | | | 704/235 |
| 2008/0120102 A1* | 5/2008 | Rao | G10L 15/22 |
| | | | 704/235 |
| 2008/0270118 A1* | 10/2008 | Kuo | G06F 17/2223 |
| | | | 704/9 |
| 2009/0076798 A1* | 3/2009 | Oh | G06F 17/279 |
| | | | 704/9 |
| 2014/0019127 A1* | 1/2014 | Park | G10L 15/01 |
| | | | 704/235 |

\* cited by examiner

BIASING VOICE CORRECTION SUGGESTIONS

CROSS-REFERENCE TO RELATED APPLICATIONS

This U.S. patent application is a continuation of, and claims priority under 35 U.S.C. § 120 from, U.S. patent application Ser. No. 16/268,957, filed on Feb. 6, 2019, which is a continuation of U.S. patent application Ser. No. 15/789,575, filed on Oct. 20, 2017, which is a continuation of U.S. patent application Ser. No. 14/988,0741, filed on Jan. 5, 2016. The disclosures of these prior applications are considered part of the disclosure of this application and are hereby incorporated by reference in their entireties.

BACKGROUND

This specification relates to natural language processing.

Conventional devices can include software to respond to speech of a user of the device. The speech can typically include instructions to the device to call a phone number, text a phone number, or search for information on the mobile device or the Internet. The device can employ conventional speech to text processes to recognize a voice input from the user.

SUMMARY

This specification describes technologies for correction of voice recognition outputs. These technologies generally involve providing a recognition output to a received voice input that includes a misrecognition, receiving a user input modifying the recognition output, and providing suggested corrected recognition outputs.

In general, one innovative aspect of the subject matter described in this specification can be embodied in methods that include the actions of receiving a voice input from a user device; generating a recognition output; receiving a user selection of one or more terms in the recognition output; receiving a user input of one or more letters replacing the user selected one or more terms; determining suggested correction candidates based in part on the user input and the voice input; and providing one or more suggested correction candidates to the user device as suggested corrected recognition outputs. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method further includes receiving a user selection of one of the suggested corrected recognition outputs; and providing one or more search results responsive to the selected suggested query. Determining suggested correction candidates includes: obtaining candidate suggestions for a corrected recognition output based on a collection of queries, wherein the candidate suggestions are ranked according to a respective score for each candidate suggestion; re-ranking the candidate suggestions based on phonetic similarity between each candidate suggestion and the received voice input; and determining one or more suggested correction candidates based on the re-ranking. Obtaining candidate suggestions includes determining queries that match a portion of the recognition output with the user input to a collection of queries and ranking the queries based on a respective popularity. Determining phonetic similarity includes calculating a phonetic distance between each candidate suggestion and the received voice input. Re-raking the candidate suggestions includes modifying the respective scores of the candidate suggestions based on whether the corresponding phonetic similarity satisfies a threshold. The method further includes: receiving additional user input letters for the one or more terms; and in response to the additional user input, updating the suggested corrected recognition outputs The subject matter described in this specification can be implemented in particular embodiments so as to realize one or more of the following advantages. Misrecognized voice inputs can be corrected with biased correction to a particular recognized term without the user starting the voice recognition process over with a new voice input. The biased correction allows the user's intended voice input to be identified more quickly. Correcting voice input improves voice recognition versatility, e.g., in performing a search in response to a voice query, or voice aided word processing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
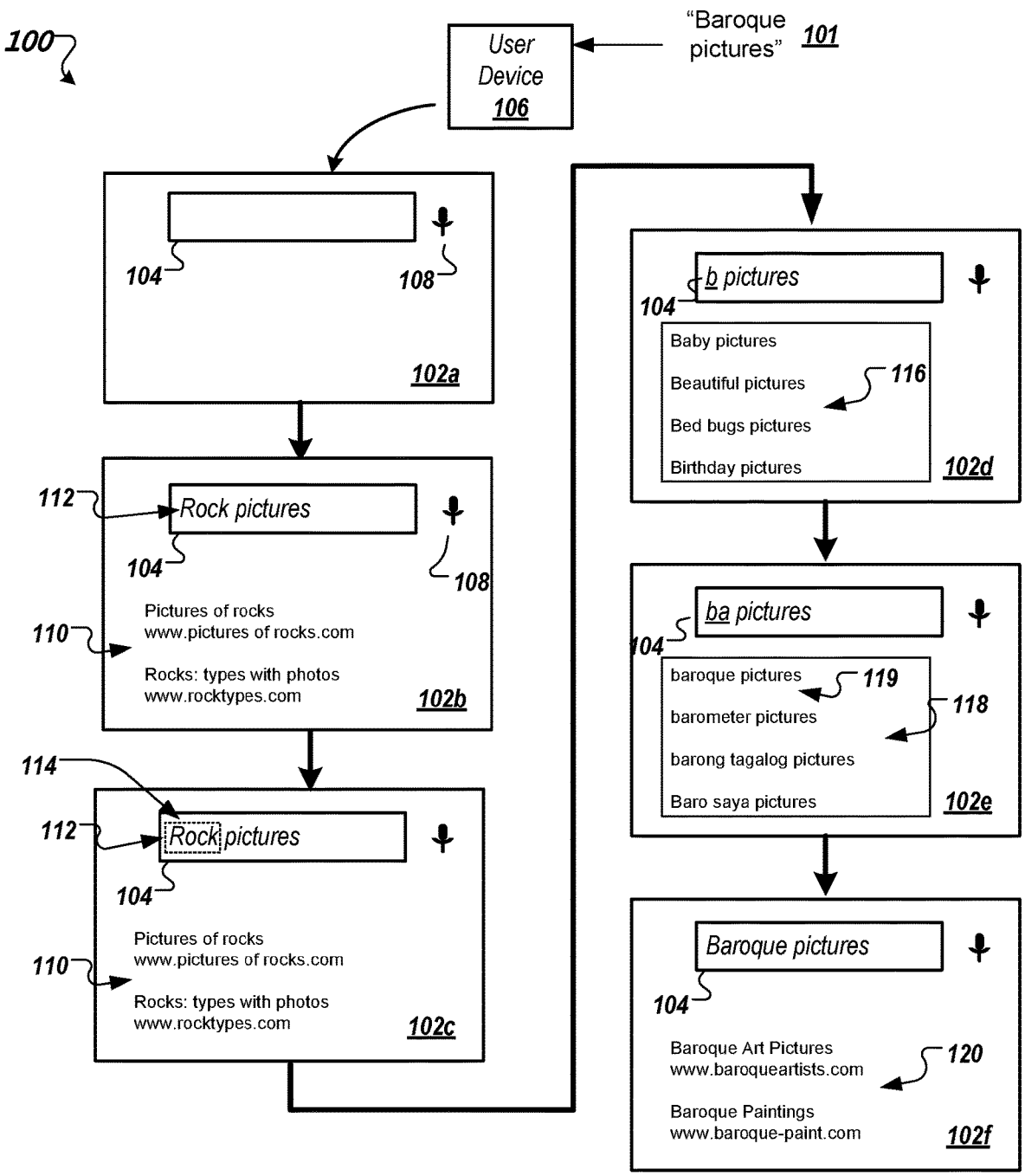
FIG. 1 is an illustration of a voice search flow including a biased correction in an example user interface.

FIG. 1 is an illustration 100 of a voice search including a biased correction in an example search user interface. A search user interface is presented as one example of using the voice recognition correction techniques described in this specification. A search system provides a search user interface 102*a* for displaying on a user device 106, e.g., a mobile phone, tablet, or other user device configured to receive voice input. The user interface 102*a* includes a search box 104 for receiving a query and a microphone icon 108 for receiving a first voice query from a user instead of a typed input. The user inputs a voice query 101, e.g., by selecting the microphone icon 108 in the user interface 102*a*. In some implementations, the user interface includes a keyboard layout that can be presented for typed input to the search box.

In a user session, the search system receives the voice query 101 from a user. In particular, the user provides a voice input of "Baroque pictures" to the user device 106. In response to the voice query, a user interface 102b is presented including a display of a recognition output 112 generated from the voice query in the search box 104. The recognition output 112 is [rock pictures]. For example, a speech-to-text process can be performed on the first voice query to generate a purported transcription as the corresponding recognition output. The search system can provide the transcription to the user device 106 for display in the user interface 102b.

Furthermore, the recognition output can be used by a search system. The search system provides search results 110 responsive to the query [rock pictures] for display in user interface 102b. For example, the search results 110 can include links to particular resources determined by the search system to be responsive to the recognized query. However, in this example, the recognized query was misrecognized.

As shown in user interface 102c, in response to the misrecognition, the user can interact with the user interface 102c to select a portion 114 of the recognition output 112 corresponding to the misrecognized term "rock". For example, in a touch interface the user can touch the misrecognized term with a finger or stylus. In a non-touch interface, the user can navigate a cursor to the misrecognized term and select the term e.g., with a mouse input.

As shown in user interface 102d, the user manually inputs one or more text characters into the search field 104 for the selected misrecognition term, in this case a letter "b." Using the partial query "b pictures," one or more corrected queries are determined and provided to the user device as suggested queries 116. The suggested queries 116 can be selected based on a popularity of candidate queries as well as phonetic features of the candidate queries relative to the voice input, as described in greater detail below.

If the user continues to type in letters for the misrecognized term, the suggested queries can be updated. For example, in user interface 102e, the user has manually input two letters of the misrecognized term as "ba". The suggestions for corrected queries 118 for "ba pictures" include "baroque pictures" 119, which was the user's initial voice input. Varying numbers of letters may be needed to identify the correct suggestion. The user can select a particular query suggestion of the displayed suggested corrected queries 118, e.g., using a touch or cursor input. In response to the selection, the suggested search query is used as a corrected search query by the search system.

As shown in user interface 102f, the corrected search query "Baroque pictures" is displayed in the search field 104. Furthermore, in response to the corrected search query, the search system provides search results 120 responsive to corrected query [baroque pictures] for presentation in the user interface 102f. For example, the search results 120 can include links to particular resources determined by the search system to be responsive to the corrected query.

Figure 2:
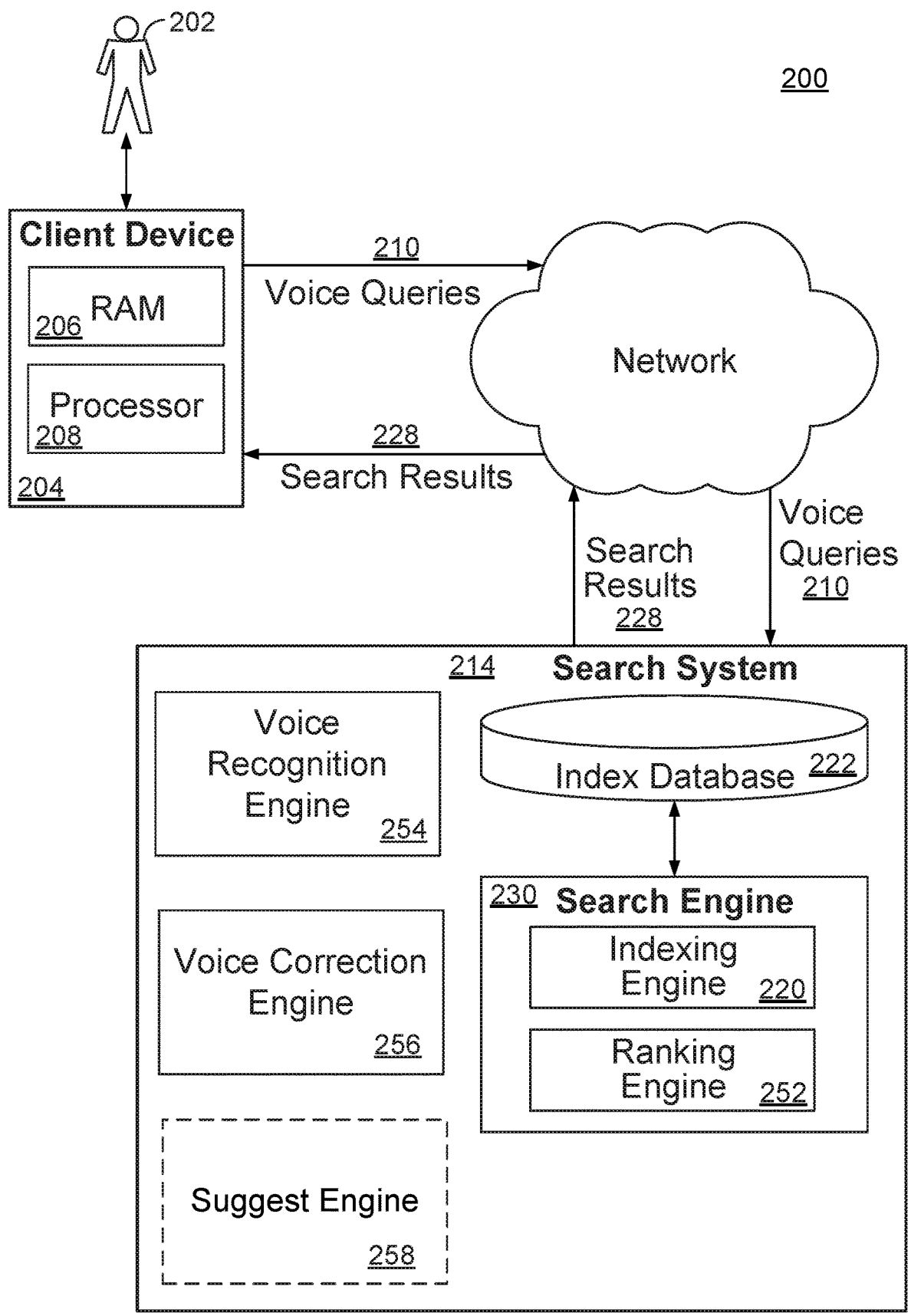
FIG. 2 is a block diagram of a system for providing corrections to voice queries.

FIG. 2 is a block diagram of a system 200 for providing corrections to voice queries. Other suitable systems can be provided for correcting other types of voice input. The system 200 provides search results relevant to submitted queries as can be implemented in an internet, an intranet, or another client and server environment. The system 200 is an example of an information retrieval system in which the systems, components, and techniques described below can be implemented.

A user 202 can interact with a search system 214 through a client device 204. For example, the client 204 can be a computer coupled to the search system 214 through a local area network (LAN) or wide area network (WAN), e.g., the Internet. In some implementations, the search system 214 and the client device 204 can be one machine. For example, a user can install a desktop search application on the client device 204. The client device 204 will generally include a random access memory (RAM) 206 and a processor 208.

The user 202 can submit voice queries 210 to a search engine 230 within a search system 214. When the user 202 submits a voice query 210, the voice query 210 is transmitted through a network to the search system 214. The search system 214 can be implemented as, for example, computer programs running on one or more computers in one or more locations that are coupled to each other through a network.

The search system 214 includes a voice recognition engine 254. The voice recognition engine receives the voice query 210 and transcribes the voice query to a recognized query, e.g., using suitable text-to-speech techniques. In some implementations, the recognized query is returned to the client device 204 for presentation to the user 202. Additionally, the recognized query is provided to the search engine 230.

The search system 214 further includes an index database 222 and a search engine 230. The search system 214 responds to an input query by generating search results 228, which are transmitted through the network to the client device 204 in a form that can be presented to the user 202 (e.g., as a search results web page to be displayed in a web browser running on the client device 204).

When the recognized query determined from the voice query 210 is received by the search engine 230, the search engine 230 identifies resources that match, or are responsive to, the query 210. The search engine 230 will generally include an indexing engine 220 that indexes resources (e.g., web pages, images, or news articles on the Internet) found in a corpus (e.g., a collection or repository of content), an index database 222 that stores the index information, and a ranking engine 252 (or other software) to rank the resources that match the query 210. The indexing and ranking of the resources can be performed using conventional techniques. The search engine 130 can transmit the search results 228 through the network to the client device 204 for presentation to the user 202.

The search system also includes a voice correction engine 256. The correction engine 256 corrects the recognized query in response to a correction input from the user 202. In particular, the voice correction engine 256 can determine that a correction input, e.g., a selection and text input associated with a particular term of the recognized query is received following presentation of the recognition output. The voice correction engine 256 can determine candidate corrected queries, score the candidate correction queries, and provide one or more corrected queries to the user device 204 based on the scores, e.g., top n ranked candidate correction queries. In some implementations, corrected queries need to satisfy a threshold score to be provided. Determining candidate corrected queries can include using a suggest engine 258 to identify candidate search queries based on the recognition output and the user input correcting a portion of the recognition output. The suggest engine 258 can be part of the search system 214 as in FIG. 2 or can be a separate system in communication with the search system 214. Similarly, one or more of the voice recognition engine 256 or the voice correction engine 256 can be part of a separate system in communication with the search system 214. Also, in other implementations, the voice recognition engine, suggest engine, and voice correction engine 256 can be part of a separate system from the search system 214, for example, when used for voice inputs other than search queries.

The candidate search queries identified by the suggest engine 258 can be further processed by the voice recognition engine 254 and voice query correction engine 256 to identify one or more ranked candidate corrected queries to present to the user device 204. In response to a user input to the user device 204 selecting a particular corrected query, the search engine 230 identifies resources that are responsive to the particular corrected query.

Figure 3:
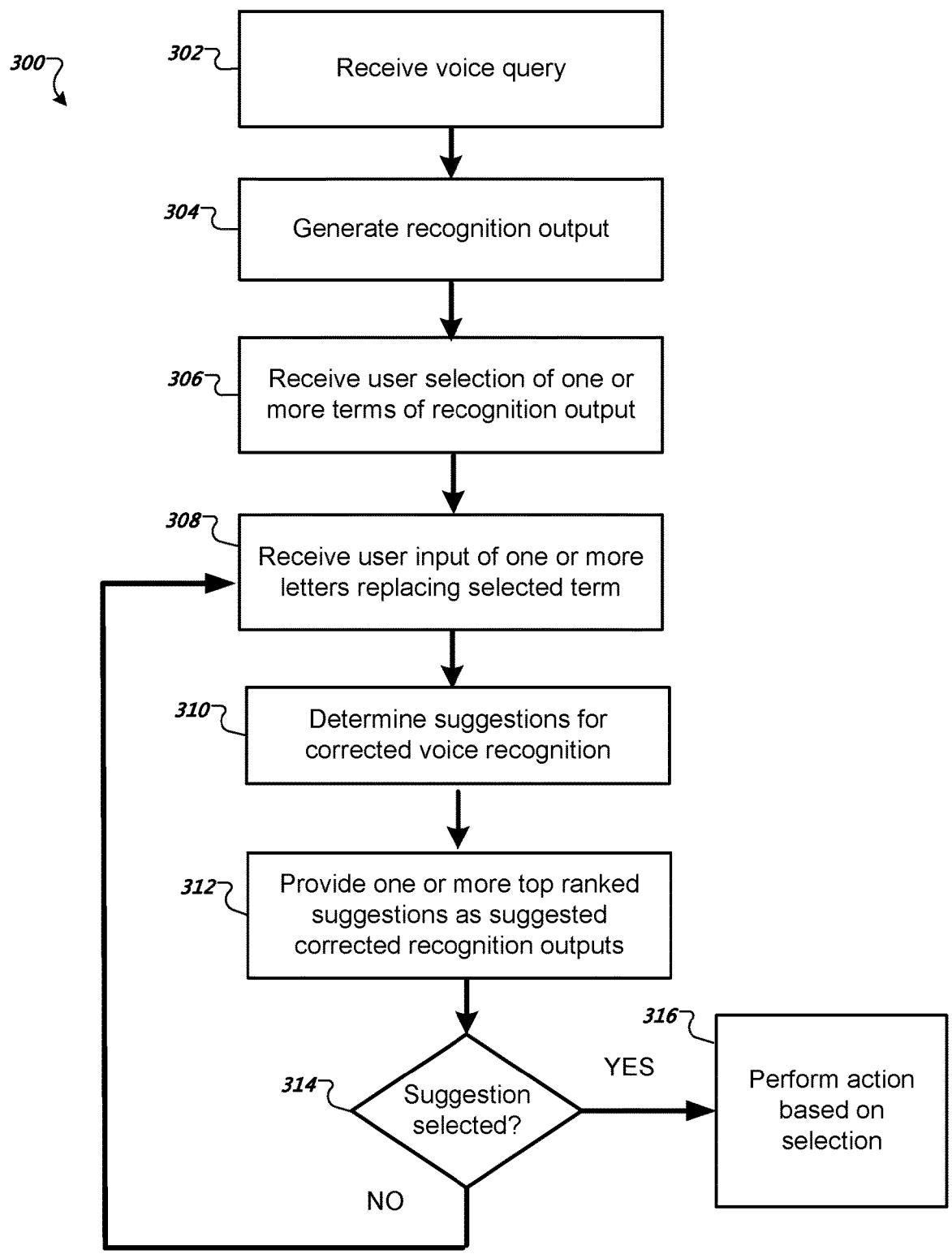
FIG. 3 is a flow diagram of an example process for correcting a voice input.

FIG. 3 is a flowchart of an example process 300 for correcting a voice input. For convenience, the process 300 will be described as being performed by a system of one or more computers, located in one or more locations, and programmed appropriately in accordance with this specification. For example, when the voice input is a search query a search system, e.g., the search system 214 of FIG. 2, appropriately programmed, can perform the process 300.

The system receives a voice input from a user device (302). For example, the user can select a voice input indicator, e.g., a microphone indicator, associated with a particular user interface indicating a voice input can be provided. For example, a search user interface of the user device can include a microphone indicator allowing a user to submit a voice query to a search system. When selected by the user, a microphone of the user device captures voice input from the user. The voice input is then transmitted by the user device to the system. The voice input can be, for example, "baroque pictures."

The system generates a recognition output (304). The recognition output is a transcription of the received voice input. For example, a suitable speech to text technique can be used to provide voice recognition of the voice input and convert it into a recognized text output. The speech to text technique can include the use of an acoustic model that identifies phonemes or other linguistic units from the audio of the voice input and a language model that assigns probabilities to particular words or sequences of words. In some implementations, the speech to text technique can correct or compensate for errors in the voice input, e.g., based on spelling and/or grammar rules. The recognition output is provided to the user device, for example, for display in a user interface. The recognition output can be displayed, for example, to indicate the system's recognition of the voice input. The user can then examine the presented recognition output to determine whether the system correctly recognized the voice input. For example, the voice input "baroque pictures" may be recognized as [rock pictures]. Here the word "baroque" was misrecognized as "rock."

Additionally, the system can perform an action responsive to the first recognition output. For example, for a search query voice input, the system can obtain search results using the first recognition output as a search query. One or more search results responsive to the search query can be provided to the user device for display in the search interface. In some implementations, the action is part of a particular task, e.g., creating a calendar entry. In some other implementations, the first recognition output corresponds to the action, e.g., inputting text in a text editor or e-mail. In some other implementations, the action is to provide an output text, e.g., in response to user dictation, corresponding to the recognition output. The output can be provided, for example, to a word processor or e-mail program.

The system receives a user selection of one or more terms of the recognition output (306). The user selection can be made by direct input, e.g., using a finger on a touch screen, or using a particular input device e.g., a mouse cursor or stylus. For example, the user can touch a particular term or terms of the recognition output. In response, the selected term or terms can be highlighted by the user device indicating the selected term or terms. Thus, for a recognition input "rock pictures," the user can select the word "rock."

The system receives a user input of one or more letters replacing the selected term or terms of the recognition output (308). For example, in response to the user selection of one or more terms of the recognition output, a keyboard can be presented in a touch interface. The user can then enter one or more letters. In some other implementations, the user can use a keyboard to provide input to replace the selected one or more terms of the recognition output.

In the example of "rock pictures" after selecting the term "rock" the user can input a letter "b". In some implementations, as described below, the initial letter may result in a correct suggestion being presented. However, the user can type additional letters if a suggestion is not presented or if a correct suggestion is not presented. For example, the user may type "baro" before the correct suggestion is presented. Suggestions can be obtained in response to each letter entry by the user.

The system determines suggestions for a corrected voice recognition (310). The system can determine the suggested corrected voice recognitions from the user input terms based on a suggest system and phonetic analysis of candidates provided by the suggest system. Determining suggested corrected voice recognitions is described in greater detail below with respect to FIG. 4.

The system provides one or more top ranked suggested corrected voice recognitions to the user device as suggested corrected recognition outputs 312 for presentation to the user. For example, the user interface can include a drop down list of suggested corrected recognition outputs below the modified form of the recognition output. A specified number of top suggested corrected recognition outputs can be provided for presentation to the user. In some other implementations, each corrected recognition output provided satisfies a threshold score value. An individual corrected recognition output can be selected by the user in a similar manner as the selections described above, e.g., a user touch input or input from a user input device.

The system determines whether one of the suggested corrected recognition outputs is selected (314). If a suggested corrected recognition output is selected (YES branch of decision 314), an action is performed based on the selection (316). The action can include, for example, submitting the selected suggested corrected recognition to a search system as a search query and obtaining search results responsive to the search query.

If the system determines that one of the suggested corrected recognition outputs is not selected (NO branch of decision 314), the user can input one or more additional letters replacing the selected one or more terms shown by a return path to 308. Thus, the process can iteratively identify suggested corrected recognition outputs as the system receives additional letters input by the user. For example, after entering "b pictures" the suggested corrected recognition outputs may not match the user's voice input. However, after entering "ba pictures" the suggested queries can include "baroque pictures," which corresponds to the user's intended voice input.

Figure 4:
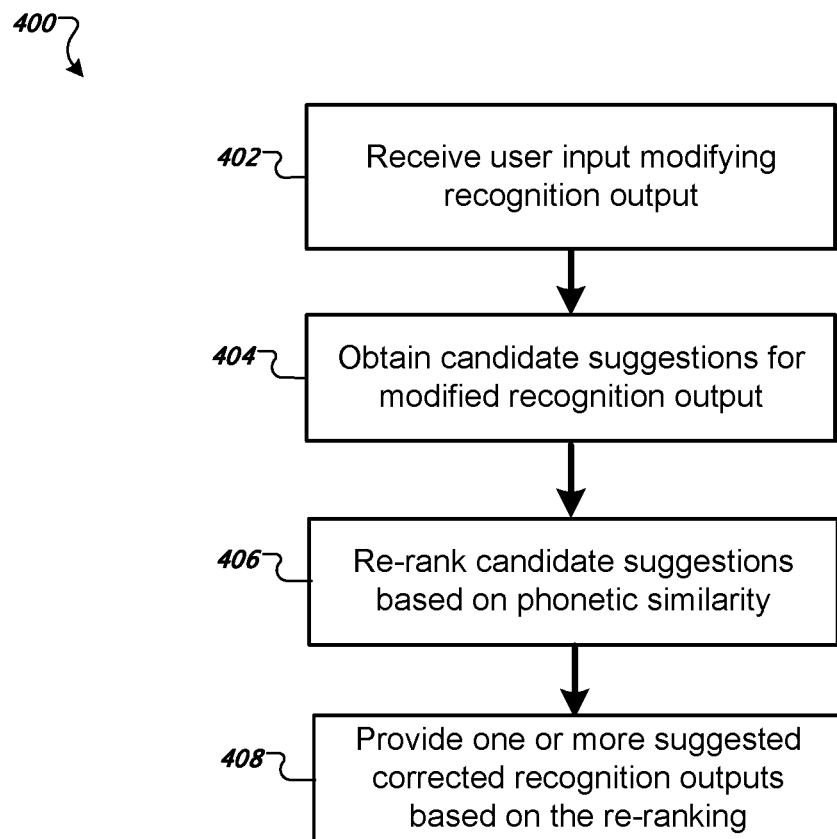
FIG. 4 is a flow diagram of an example process for determining a suggested correction.

In some implementations, the system identifies suggested corrected voice recognitions in response to the user selection of one or more terms in the recognition output and prior to any user input of one or more letters. The system can determine the suggested corrected voice recognitions from the unselected terms in the recognition output and based on a suggest system and phonetic analysis of candidates provided by the suggest system FIG. 4 is a flow diagram of an example process 400 for determining a suggested correction. For convenience, the process 400 will be described as being performed by a system of one or more computers, located in one or more locations, and programmed appropriately in accordance with this specification.

The system receives user input modifying a recognition output (402). The recognition output can be generated in response to a voice input, e.g., of a search query, provided by a user to a user device. For example, as described above with respect to FIGS. 1-3, the user can provide an input selecting a particular term or terms of the recognition output. The user can then manually input one or more letters replacing the selected term or terms. For example, the user can input a first letter of a corrected word that should replace a misrecognized term of the recognition output.

The system obtains candidate suggestions for a corrected recognition output, e.g., a corrected search query (404). In some implementations, the modified form of the recognition output following the user input is provided to a suggest system. The suggest system uses the portion of the recognition output to determine one or more candidate corrected recognition outputs. In particular, the candidate corrected recognition outputs predict a completed recognition output based on the user modifications.

For example, the suggest system can compare the modified output to a collection of queries. The collection of queries can include queries submitted by a collection of different users over a specified amount of time. The comparison can identify queries in the collection of queries that match the modified portion of the recognition output. For example, if the recognition output "rock pictures" is modified by the user as "b pictures" the suggest system identifies queries in the collection that includes a word beginning with the letter "b" and including the word "pictures." From the matching queries, a specified number of top ranking queries can be selected as candidate corrected recognition outputs. From the example of "b pictures," the identified top ranking candidates can include: birthday pictures, beautiful pictures, baby pictures, and bed bug pictures. The ranking of the queries can be determined based, for example, on a score calculated according to a popularity measure associated with the query. For example, the popularity measure can be based on how many times each query was submitted by different users of the collection of users during the specified amount of time.

The system re-ranks the candidate suggestions (406). The re-ranking can be based on a phonetic similarity of the candidate suggestions relative to the user voice input. In particular, each candidate suggestion can be associated with a score used to initially rank the candidate suggestions. The score can be adjusted based on a phonetic similarity between each candidate suggestion and the received voice input. The phonetic similarity measures how similar the sound of the candidate suggestion is to the voice input. Phonetic similarity between each candidate suggestion and the received voice input can be determined using a suitable distance measure. For example, the phonetic distance can be based on a minimum edit distance between the candidate suggestion and the voice input. In some implementations, the minimum edit distance measures a number of different sounds between the candidate suggestion and the voice input. In some implementations, the minimum edit distance is calculated using phonetic dictionaries. In some other implementations, the minimum edit distance is calculated using an acoustic models, for example, acoustic Hidden-Markov-Models.

The phonetic representation of the original voice query when evaluating a correction request from the user can be obtained from the client device. For example, the phonetic representation can be returned to the client with the recognition output. The client can then provide the phonetic representation with the correction request, e.g., the user selection of one or more terms of the recognition output or the entry of one or more letters replacing the selection. In some other implementations, the phonetic representations can be stored by the system when determining the recognition output. The stored phonetic representation can be retrieved in response to the correction request.

In some implementations, the score is boosted, e.g., by a multiplier, if the phonetic distance between the candidate suggestion and the voice input satisfies a threshold. Alternatively, in some other implementations, the score can be reduced, e.g., by a multiplier, if the phonetic distance does not satisfy the threshold. In some implementations the threshold is based on a number of different sounds out of a total number of sounds. For example, for a particular candidate suggestion, if the number of different sounds, absolute number or percentage, is less than the threshold then a multiplier can be applied to boost the score of that candidate suggestion. The candidate suggestions can be re-ranked according to the scores after any boost or reduction is applied.

The system provides one or more re-ranked candidate suggestions to the user device as suggested corrected recognition outputs (408). In some implementations, the system provides the one or more suggested corrected recognition outputs to be presented on the user device in ranked order, e.g., a top five suggested corrected recognition outputs. For example, the suggested corrected recognition outputs can be presented in a list below the user input field showing the modified recognition output.

In some implementations, a total score for each candidate suggestion is calculated in a single step. For example, the candidate suggestions identified, e.g., by a suggest system, can be scored based on a combination of the suggest score and a score adjustment based on the phonetic similarity of each candidate suggestion relative to the user voice input. The combined score can be used to rank the suggestions and identify one or more top ranked suggestions to provide to the user device as suggested corrected recognition outputs.

In some implementations, each individual suggested corrected recognition output is selectable by the user, e.g., though touch or user device input. After selection of a particular suggested corrected recognition output, an action can be performed. For example, search results can be obtained and provided in response to the suggested corrected recognition output.

In some implementations, instead of selecting one of the suggested corrected recognition outputs, the user further modifies the modified recognition output, e.g., by inputting additional letters. In response, the system can identify one or more new suggested corrected recognition outputs in a similar manner as described above.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    receiving, at a user device, a voice input from a user of the user device;
    displaying, by the user device, an initial recognition output in a graphical user interface based on the voice input, the initial recognition output comprising an initial transcription of the voice input, the initial transcription comprising a misrecognized term;
    receiving, at the user device, a selection indication indicating a user selection in the graphical user interface of a portion of the initial recognition output to correct the misrecognized term;
    after receiving the selection indication, displaying, by the user device, a first list of suggested recognition outputs of the voice input in the graphical user interface, each suggested recognition output of the first list comprising a respective phonetic similarity to the received voice input;
    after displaying the first list of suggested recognition outputs, receiving, at the user device, one or more text characters inputted by the user through the graphical user interface; and
    replacing, by the user device, the misrecognized term based on the received one or more text characters to provide a corrected transcription of the voice input.

2. The method of claim 1, wherein replacing the misrecognized term based on the received one or more text characters comprises:
    displaying, in the graphical user interface, a second list of suggested recognition outputs in response to receiving the one or more text characters inputted by the user, each suggested recognition output of the second list of suggested recognition outputs comprising a respective phonetic similarity to the one or more text characters;
    receiving another selection indication indicating a user selection in the graphical user interface of one of the suggested recognition outputs of the second list of suggested recognition outputs; and
    replacing the misrecognized term using the selected suggested recognition output of the second list of suggested recognition outputs.

3. The method of claim 2, further comprising iteratively identifying, by the user device, the suggested recognition outputs for inclusion in the second list of suggested recognition outputs displayed in the graphical user interface responsive to receiving each text character of the one or more text characters.

4. The method of claim 1, further comprising displaying, by the user device, in the graphical user interface, the one or more text characters inputted by the user through the graphical user interface.

5. The method of claim 1, wherein the one or more text characters comprise one or more letters inputted by the user through the graphical user interface.

6. The method of claim 1, further comprising, in response to receiving the selection indication, displaying, by the user device, a keyboard in the graphical user interface.

7. The method of claim 1, wherein the first list of suggested recognition outputs of the voice input displayed in the graphical user interface are ranked according to the respective phonetic similarity between each suggested recognition output and the received voice input.

8. The method of claim 1, wherein the first list of suggested recognition outputs of the voice input displayed in the graphical user interface are based on a popularity of the suggested recognition outputs.

9. The method of claim 1, further comprising, after receiving the selection indication, superimposing, by the user device, a graphical indicator in the graphical user interface over the misrecognized term of the initial transcription.

10. The method of claim 1, wherein the initial recognition output corresponds to an action of inputting text in a text editor or an electronic message.

11. A user device comprising:
    data processing hardware; and
    memory hardware in communication with the data processing hardware and storing instructions that when executed on the data processing hardware cause the data processing hardware to perform operations comprising:

receiving a voice input from a user of the user device;

displaying an initial recognition output in a graphical user interface based on the voice input, the initial recognition output comprising an initial transcription of the voice input, the initial transcription comprising a misrecognized term;

receiving a selection indication indicating a user selection in the graphical user interface of a portion of the initial recognition output to correct the misrecognized term;

after receiving the selection indication, displaying a first list of suggested recognition outputs of the voice input in the graphical user interface, each suggested recognition output of the first list comprising a respective phonetic similarity to the received voice input;

after displaying the first list of suggested recognition outputs, receiving one or more text characters inputted by the user through the graphical user interface; and replacing the misrecognized term based on the received one or more text characters to provide a corrected transcription of the voice input.

12. The user device of claim 11, wherein replacing the misrecognized term based on the received one or more text characters comprises:

displaying, in the graphical user interface, a second list of suggested recognition outputs in response to receiving the one or more text characters inputted by the user, each suggested recognition output of the second list of suggested recognition outputs comprising a respective phonetic similarity to the one or more text characters;

receiving another selection indication indicating a user selection in the graphical user interface of one of the suggested recognition outputs of the second list of suggested recognition outputs; and replacing the misrecognized term using the selected suggested recognition output of the second list of suggested recognition outputs.

13. The user device of claim 12, wherein the operations further comprise iteratively identifying the suggested recognition outputs for inclusion in the second list of suggested recognition outputs displayed in the graphical user interface responsive to receiving each text character of the one or more text characters.

14. The user device of claim 11, wherein the operations further comprise, displaying in the graphical user interface, the one or more text characters inputted by the user through the graphical user interface.

15. The user device of claim 11, wherein the one or more text characters comprise one or more letters inputted by the user through the graphical user interface.

16. The user device of claim 11, wherein the operations further comprise, in response to receiving the selection indication, displaying a keyboard in the graphical user interface.

17. The user device of claim 11, wherein the first list of suggested recognition outputs of the voice input displayed in the graphical user interface are ranked according to the respective phonetic similarity between each suggested recognition output and the received voice input.

18. The user device of claim 11, wherein the first list of suggested recognition outputs of the voice input displayed in the graphical user interface are based on a popularity of the suggested recognition outputs.

19. The user device of claim 11, wherein the operations further comprise, after receiving the selection indication, superimposing a graphical indicator in the graphical user interface over the misrecognized term of the initial transcription.

20. The user device of claim 11, wherein the initial recognition output corresponds to an action of inputting text in a text editor or an electronic message.

* * * * *